I. G. Johnson,
Sawing Shingles.
Nº 3,701.  Patented Aug. 12, 1844.
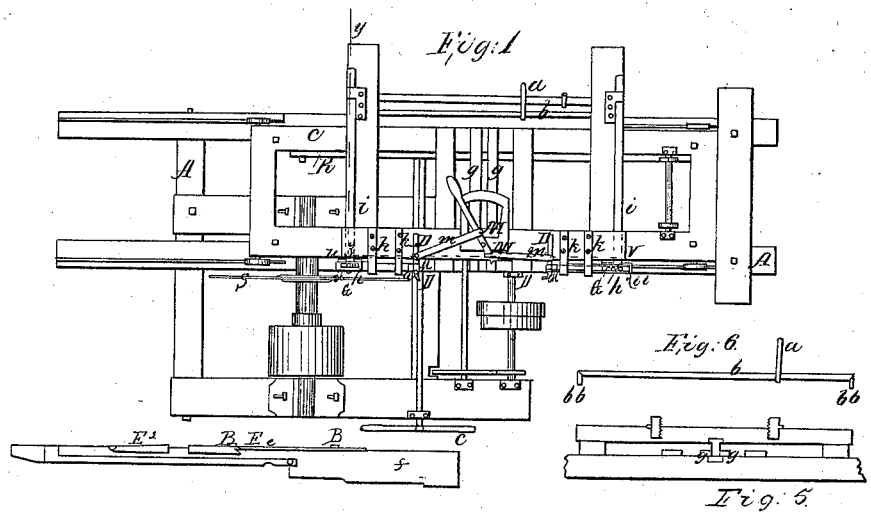
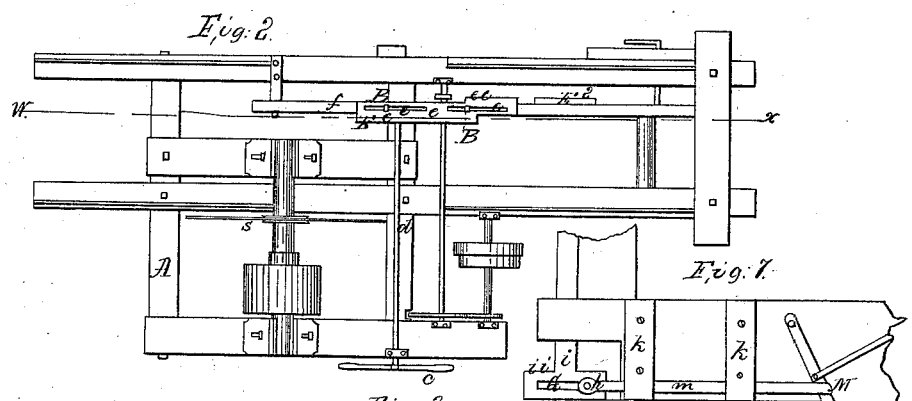
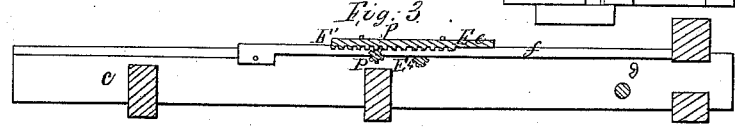
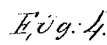
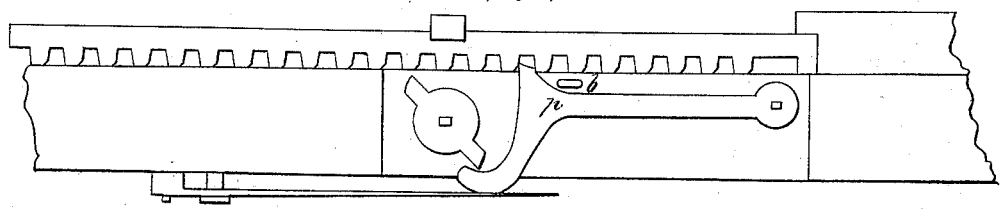

UNITED STATES PATENT OFFICE.

ISRAEL G. JOHNSON, OF AUGUSTA, MAINE.

MACHINE FOR SAWING SHINGLES.

Specification of Letters Patent No. 3,701, dated August 12, 1844.

*To all whom it may concern:*

Be it known that I, ISRAEL G. JOHNSON, of Augusta, county of Kennebec, and State of Maine, have invented certain new and useful Improvements in Machines for Sawing Shingles; and I do declare that the following is a full, clear, and exact description of the construction and operation of the same, reference being had to the annexed drawings of the same, making part of this specification, in which—

Figure 1 is a top view of the machine. Fig. 2 is a plan of the frame and ways—the carriage being removed therefrom. Fig. 3 is a section through Fig. 2 on dotted line $w\ x$. Fig. 4 is a section through Fig. 1 on $y\ z$. Fig. 5 is a section through the dogs D. Fig. 6 is the rod and combs detached from the carriage. Fig. 7 is a side view of the bar and slides.

The nature and advantages of my improvements consist in, first, the rod and cam for the purpose of more easily disengaging the gage dogs from the gage racks. The advantage of my rod and cam over the method now in use is that both gage dogs can be thrown out of the gage racks by one operation and my method is less expensive and more durable and not complicated. The second is a shifting gage, which being moved on the bar $f$ Fig. 2 enables the carriage to move to any point required according to the length or width of the required shingles without the substitution of gage plates of different lengths. The method now in use has this disadvantage that the carriage must move to a definite point which is four or five inches short of the center of the saw, so that whether the shingles be wide or narrow the carriage will be stopped by the permanent gage on the bar $f$ Fig. 2 unless the gage be changed. By my improvement the carriage may be permitted to run to the center of the saw if the shingles should be wide, or stopped at any point whenever the shingles by being narrow are sawed off, or if the shingles are of unequal lengths without the necessity of changing the gage, but merely the position. Another advantage of my improvement is that as the saw becomes smaller by use the carriage is permitted to run until the shingle is sawed off and also by the use of my improvement one-eighth more shingles can be manufactured than by the common machine in any given time. Still another advantage is, that by my improvement there is a saving of lumber, by permitting the bolts or blocks to run to the center of the saw whenever their width shall require it. My third improvement is a better and more durable method of securing the head stock of the carriage while the machine is in operation, confining the head stock in a true and firm position. And my fourth improvement is in the manner of extending and contracting the dogs for admitting longer or shorter bolts or shingle blocks to be sawed without varying the thickness of the butts and points of the shingles.

To enable others skilled in the art to make and use my improvements I will describe their construction and operation.

I construct a machine so as to resemble generally the machine now in use and known as the "circular saw shingle machine," in which the frame A, carriage C, saw S, dogs D and other parts are made in the usual manner.

My improvements are as follows:

First, instead of the method now in use for disengaging the gage dogs from the gage racks, I construct an iron rod $b$ of suitable size, the ends being turned at right angles one half an inch in length forming at each end a cam $b\ b$ as shown at Fig. 6. The position of the rod on the carriage is shown at $b$ Fig. 1. At $b$ Fig. 4, is an end view showing how the gage dog $p$ is thrown out of the gage rack. When the machine is in operation the handle $a$ Fig. 1 and the cam $b$ Fig. 4 are in a horizontal position, but by turning the handle up the cam $b$ Fig. 4 is turned down which presses the gage dog $p$ Fig. 4, which is thrown out of the rack which permits the head stock to be drawn back whenever it is necessary.

Second, the method of stopping the advance of the carriage at any point required: It is well known that on the machine now used the carriage must run a given distance and no farther, whether it is necessary or not. To obviate this disadvantage I construct a gage in the following manner: Instead of having a permanent long "slide" of twenty six or more inches in length as is now used attached to the bar $f$ Fig. 2 I make a permanent section $E^2$ of the slide (about seven or ten inches in length) fixed to the side of the bar $f$, then by the means of a shifting or sliding section of the slide or gage $E^e$ Fig. 2 which slides or moves on the bar *f* a top view of which is seen at E⁶ Fig. 2, and a side view at E⁶ Fig. 3. A rack E⁴ is made on the underside of the said shifting gage or section of the slide projecting out from the bar *f* toward the saw one and a half inches. On the other side of the bar *f* the portion of the gage *e e* extends out one half an inch and turns down at right angles sufficiently to correspond to the section E² of the slide fastened to the bar *f* which as stated above is made about seven or ten inches long. Grooves are made in the "slide" or gage E⁶ as shown at *e* Fig. 2. In these grooves iron bolts B are inserted into the bar *f* Fig. 2, sufficient to render the gage permanent except when required to be moved by the operator in turning the windlass *c* Fig. 2. To move the gage E⁶ I use a shaft *d* Fig. 2 on one end of which is a windlass *c* Fig. 2 and on the other is a pinion P Fig. 3 which is geared into the rack E⁴ on the under side of the gage E⁶. When the rack R Fig. 1 which is attached to the carriage C passes out from under the gage E⁶ Fig. 2 (effected by a weight cord and pulley in the usual way) and rises to the upper surface thereof the carriage is drawn back by a weight as is used by all shingle machines. It will be seen that the gage can be moved to any point or distance required by the windlass without the necessity of stopping the machinery. The projection or lip on the side of the rack R which is made in the usual manner travels over, under, and around the aforesaid permanent section E² and shifting section E⁶ of the slides E² E⁶ in the direction indicated by the arrows—Fig. 8.

Third, the method of securing the head stock to the carriage: I firmly attach two iron bars *g g* to the carriage one inch apart and two inches wide at equal distances from the center of the head stock forming a groove at *g g* Figs. 1, and 5. In this groove made by the bars *g g* Figs. 1 and 5 is placed an iron rail made in the form of a section of a T rail secured firmly to the head stock and should slide freely under and between the bars say one eighth of an inch smaller than the distance between the bars.

Fourth, the method by which I alter the position of the dogs D and of the sliding connecting joint pins *h* that connect the dogs to the parallel sliding rack gages *i* in the form of the letter T or with a T on the end of the rack leaving a groove G in it as shown on an increased scale at *i i* in Fig. 7: To each bolt dog D I attach an iron connecting bar *m* by a pin *n* at one end and at the other end of which bar *m* is a bolt *h* which slides in the groove G in the T head of the gage rack *i* Fig. 7. The bolts *h* are what I term the sliding joint bolts and by opening or extending the dogs D the bolts *h* are also extended in proportion to the length of the shingle blocks to be inserted between the dogs and sawed into shingles, while at the same time the connection between the dogs D and gage racks *i* remains complete, and the thickness of the butts and points of the shingle remain the same. The sliding bars *m* are kept in place by iron straps *k k* Fig. 7, secured to the head stock. The parallel sliding T head racks are both to be constructed alike and as above described.

What I claim as my invention and which I desire to secure by Letters Patent is—

1. Making the gage plate E⁶ E² in two parts—one permanent and the other movable and called a shifting gage to gage the length of the motion of the carriage to correspond with the length of shingle to be cut as described.

2. I also claim connecting the dogs D to the rack gages *i* by means of the bolts *h* in the connecting rods *m* and oblong slots G in the T heads of the rack gages *i* by means of which arrangement the same thickness is given to the butts and points of the shingles whatever may be the difference in their length by the same motion of the rack gages *i* as described.

I. G. JOHNSON.

Witnesses:
Wm. P. Elliot,
A. E. Johnson.